United States Patent
Cobianu et al.

(10) Patent No.: US 9,574,929 B2
(45) Date of Patent: Feb. 21, 2017

(54) COUPLING DEVICE FOR IMPEDANCE MATCHING TO A GUIDED WAVE RADAR PROBE

(71) Applicant: HONEYWELL INTERNATIONAL INC., Morristown, NJ (US)

(72) Inventors: Cornel Cobianu, Bucharest (RO); Ion Georgescu, Bucharest (RO); Michael Kon Yew Hughes, Vancouver (CA); Stuart James Heath, Surrey (GB); Frank Martin Haran, North Vancouver (CA)

(73) Assignee: Honeywell International Inc., Morristown, NJ (US)

(*) Notice: Subject to any disclaimer, the term of this patent is extended or adjusted under 35 U.S.C. 154(b) by 443 days.

(21) Appl. No.: 14/133,110

(22) Filed: Dec. 18, 2013

(65) Prior Publication Data
US 2015/0168201 A1 Jun. 18, 2015

(51) Int. Cl.
| | |
|---|---|
| G01S 13/08 | (2006.01) |
| G01F 23/284 | (2006.01) |
| H01P 5/08 | (2006.01) |
| G01S 7/03 | (2006.01) |
| G01S 13/88 | (2006.01) |

(52) U.S. Cl.
CPC .......... G01F 23/284 (2013.01); G01S 7/03 (2013.01); G01S 13/88 (2013.01); H01P 5/085 (2013.01)

(58) Field of Classification Search
CPC ........... G01F 23/284; G01S 7/03; H01P 5/085
USPC ........................................ 342/124; 73/290 V
See application file for complete search history.

(56) References Cited

U.S. PATENT DOCUMENTS

| | | | |
|---|---|---|---|
| 4,952,892 A | 8/1990 | Kronberg | |
| 6,266,022 B1* | 7/2001 | Muller | G01F 23/284 324/644 |
| 2004/0173020 A1* | 9/2004 | Edvardsson | G01F 23/284 73/290 V |
| 2006/0225499 A1* | 10/2006 | Gravel | G01F 23/284 73/290 V |

(Continued)

FOREIGN PATENT DOCUMENTS

EP 2490040 8/2012

OTHER PUBLICATIONS

Glenn Elmore, "Introduction to the Propagating Wave on a Single Conductor", Corridor Systems, Inc., Jul. 27, 2009.

*Primary Examiner* — Marcus Windrich
(74) *Attorney, Agent, or Firm* — Jetter & Associates, P.A.

(57) ABSTRACT

A coupling device for impedance matching a probe of a guided wave radar (GWR) system. A feed-through is for connecting to a coaxial cable or other transmission line connector that includes an inner conductor which connects to an output of a transceiver and an outer conductor that connects to an outer metal sleeve. A subwavelength coaxial transmission line (CTL) having a length from $\lambda/5$ to $\lambda/2$ is coupled to the feed-through including an inner conductor connected to the inner conductor of the feed-through and an outer conductor connected to the outer metal sleeve. A mode converter (MC) having a plurality of metal fingers (7) of length $2\lambda\pm$ twenty percent is connected to the outer conductor of the subwavelength CTL, where the MC includes a dielectric coating on its inner conductor connected to the inner conductor of the subwavelength CTL.

19 Claims, 3 Drawing Sheets

(56) References Cited

U.S. PATENT DOCUMENTS

| | | | |
|---|---|---|---|
| 2007/0085729 A1* | 4/2007 | Edvardsson | G01F 23/284 342/124 |
| 2007/0205781 A1* | 9/2007 | Eriksson | G01F 23/284 342/124 |
| 2008/0150789 A1* | 6/2008 | Jirskog | G01F 23/284 342/124 |
| 2009/0303106 A1* | 12/2009 | Edvardsson | G01F 23/284 342/124 |

* cited by examiner

COUPLING DEVICE FOR IMPEDANCE MATCHING TO A GUIDED WAVE RADAR PROBE

FIELD

Disclosed embodiments relate to coupling devices for coupling and impedance matching for a guided wave radar (GWR) probe.

BACKGROUND

Guided Wave Radar (GWR) level transmitters are widely used for process level measurement and process control in a variety of applications including chemical, petrochemical and medical, as well as in custody transfer, marine and transportation. GWR level transmitters work on the principle of time domain reflectometry (TDR), where the time elapsed between sending a microwave pulse along a metal probe which is guiding it, and receiving its "echo" reflected from the surface and/or interface of interest is measured and analyzed. The half trip time multiplied by the light velocity provides the level and/or interface depending on application requirement.

For GWR radar operation, a short electromagnetic (E-M) pulse with a duration from much less than 1 ns (100 ps) to about 10 ns is generated in an electronic block (transceiver) which is propagated with light velocity along a 50-100Ω coaxial cable to the tank input. Such a 50-100Ω coaxial cable acts as a transmission line allowing mainly electromagnetic waves of transversal electric magnetic mode (TEM) mode ($E_z=0$, $H_z=0$) to propagate through it, while the other electromagnetic wave modes propagating therein are negligible due to the specific geometrical construction of the cable (inner conductor diameter, outer conductor diameter and type of dielectric used in between them). The coaxial line is generally connected to a 50-100Ω coupling device ("feed-through") acting as a coaxial transmission line. Other GWR systems for level measurement replace the coaxial cable with a transmission line on a printed circuit board assembly (PCBA) terminated on a coaxial connector which is—coupled to the process connector.

From this "feed-through" device, the electromagnetic signal is further guided by the probe and enters either directly in the opening of the tank (threaded process connection), or in other cases, a guided wave travels first through a "tank interface" referred to as a nozzle, and then enters the tank. The nozzle is a small cylinder having a mounting flange at one end, while at the other end it is welded to the tank.

The nozzle's diameter is in general, larger than its height, but not always. Once entering the tank, the electromagnetic (E-M) pulse is guided by the probe in the free space area of the tank, where the free space impedance is about 377Ω. Independent of their geometries, nozzles in conjunction with a central electrical conductor more or less functions as a coaxial transmission line of higher impedance with respect to the 50-100Ω impedance of coaxial cable or feed-through, but smaller than the free-space impedance, of 377Ω.

According to this analogy, the impedance of the nozzle can be calculated like in the case of coaxial transmission lines, by the formula $Z_h=(60/\epsilon_r^{1/2})*\ln(D/d)$, where "D" is the diameter of the outer conductor (i.e., the nozzle wall), "d" is the diameter of the single conductor probe going through it, while $\epsilon_r$ is the dielectric constant of the material present between the outer conductor and inner conductor, (in this case, air). However, nozzles of diameters larger than a certain value are not always similar to the "standard" coaxial line, as they allow the propagation of E-M waves of frequencies higher than a cutoff frequency approximated by the formula $fc=190.85/[(D+d)*\epsilon_r^{1/2}]$, where "D" and "d" are in mm, the nozzles also support higher order E-M modes including transversal electric ($TE_{11}$) mode ($E_z=0$, $H_z\neq 0$). Such a $TE_{11}$ mode will propagate with a different phase velocity and will interfere with the TEM mode thus creating parasitic reflections, called "ringing", which will decrease the accuracy of level measurement closer to the top of the tank, and, will thus decrease the maximum level range. Such a 'ringing" effect will be visible even for nozzle diameters (D) equal to 4" (4 inches=10.16 cm) for interrogation pulses of duration shorter than 0.25 ns, for which, a larger portion of the frequency bandwidth will be higher than the above cutoff frequency. The impedance mismatch between the "feed-through" device and the nozzle entrance causes the first major reflection of the E-M wave, but, the time at which this first reflection occurs can be useful as a time reference for pulse runtime.

The impedance mismatch between the output of the nozzle and the free-space impedance of the probe, located deeper inside the tank also generates parasitic E-M reflections. These parasitic reflections at the input and output of the nozzle reduce the remaining energy of the E-M wave to be used for level measurement of the product, and thus reduce the maximum range of the level measurement, taking also into account the attenuation along the probe. In addition, these parasitic reflected waves also reduce the ability to accurately measure the level of the product near the top of the tank. From this reason, GWR level transmitters generally define an upper dead-zone, inside which the product level cannot be measured. The higher the impedance mismatches, the larger the dead-zones and more accuracy is reduced in level measurement near the top of the tank. Different approaches have been used in an attempt to minimize these parasitic reflections.

One approach for reducing the reflections from the end of the tank nozzle utilizes a tapered thickness dielectric coating layer on the probe starting below the nozzle. The tapered dielectric coating introduces a somewhat smoother impedance transition from nozzle impedance to the free space impedance, of about 377Ω. Although there is some reduction of feed-through echo from this approach, the ringing effect due to larger nozzle diameter and/or lower duration of the interrogation pulse is still not solved. Moreover, this known approach is dependent on the particular nozzle geometry, with amplitude of echo coming from the end of feed-through/nozzle entrance which is increasing with nozzle diameter increase.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include "coupling devices" for use in guided wave radar (GWR) systems that provide improved level measurements that include a single conductor probe inside a storage tank (hereafter "tank") and a transceiver outside the tank connected to a 50 to 100Ω coaxial cable or other transmission line connector (e.g., a transmission line on a PCBA terminated on a coaxial connector which is coupled to the process connector). Disclosed coupling devices comprise a feed-through to which a coaxial transmission line (CTL) is attached, and a mode converter (MC) having a plurality of metal fingers. Optionally, the coupling device can also include a tapered dielectric coating which can be considered an extended portion of the MC as it has been found to help confine the electric field lines and the electromagnetic energy to the mouth of the MC.

Through improved impedance matching and minimization of the ringing effects, there is a reduction in signal loss, including a reduction in unwanted influence (e.g., echoes) from the top of the tank and also from the nozzle output for tanks having nozzles, while the dead-zone length can be reduced, and the accuracy of level measurement and level range may also be increased. A transceiver outside the tank is for generating, transmitting and receiving electromagnetic signals; and the single conductor probe inside the tank is connected to transceiver's coaxial cable or a transmission line on a transceiver PCBA which is terminated at a coaxial connector on PCBA which can be directly butt coupled to the feed-through of a disclosed coupling device at the top of the tank. As noted above, in either case, the feed-through can have an impedance of 50 to 100Ω.

In operation, the single conductor probe guides a transmitted signal from the transceiver towards a surface of the product, and returns signals including a surface echo signal resulting from reflection or scattering of the transmitted signal at said product surface back towards the transceiver. The transceiver includes a processor (e.g., a digital signal processor or microcontroller unit (MCU)) for determining a product filling level based on analyzing the surface echo signal.

Disclosed coupling devices include a feed-through having an outer metal sleeve and an inner conductor for connecting to a transceiver block through an inner conductor of the coaxial cable or a transmission line on a PCBA which is terminated at a coaxial connector (which can be directly butt coupled to the feed-through) connected to the transceiver, to which a subwavelength CTL, and then a MC are coupled to. The term "subwavelength" as used in a disclosed subwavelength CTL refers to a length being less than a wavelength of the radar signal propagating in the probe during system operation. For example, if the radar pulse width in the time domain has a duration of about 0.5 ns, then one can consider that the central operation frequency to be below 2 GHz, and the wavelength, ($\lambda$) (in air, where $\in_r$=1)) then being higher than 15 cm. In the case of a wideband interrogation pulse, the associated wavelength is calculated by means of the center frequency of that wideband.

The subwavelength CTL generally has a length from $\lambda/5$ to $\lambda/2$. The subwavelength CTL can have an impedance that provides an impedance mismatch of 3% to 20% with respect to an impedance of the feed-through. As an example, for the case of the 50Ω coaxial for the feed-through, the subwavelength CTL can have an impedance of 35 to 48 ohms or 52 to 65 ohms to produce generally desirable fiducial reflections, and includes a dielectric between its conductors. The MC has a plurality of metal fingers of length $2\lambda\pm20\%$ which are connected to the outer conductor of the subwavelength CTL and includes a dielectric coating on its inner conductor that is connected to the inner conductor of the subwavelength CTL.

The MC is operable to help confine the electric field lines and the electromagnetic energy to the mouth firmer conductor) of the MC. The metal sleeve of the feed-through, the outer conductor of the subwavelength CTL, and the plurality of metal fingers of the MC can all be made from a common piece of material and thus be integrally and electrically connected together, which allows referring herein to this embodiment of disclosed coupling devices as having a monolithic form, and which can include a plurality of different dielectrics designed to comply with 50Ω (or other) impedance and to seal together, terminating on sub-wavelength transmission line, a MC with metal fingers, and then an impedance adaptation (matching) region including a tapered dielectric coating. As noted above, a similar approach in the design of a disclosed coupling device is performed for the case of a transceiver coupled to a transmission line on a PCBA terminated at a coaxial connector, which is butt coupled to a disclosed feed-through of a disclosed coupling device.

DETAILED DESCRIPTION

Figure 1:
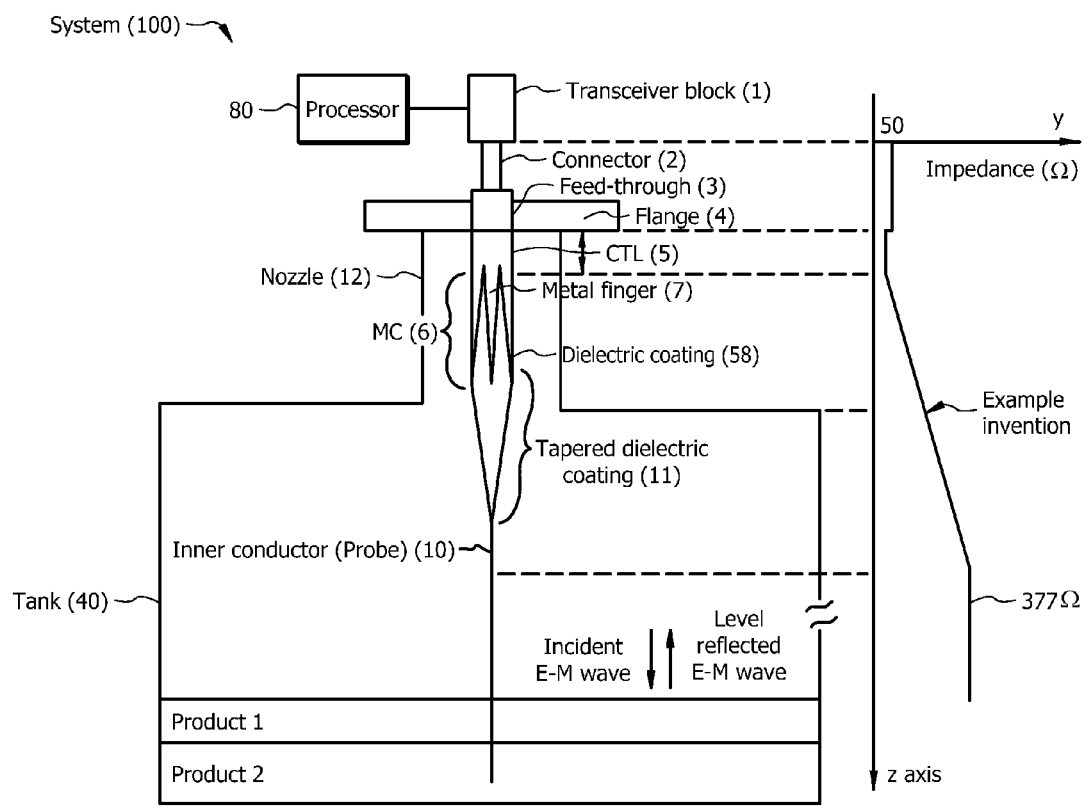
FIG. 1 depicts a radar level gauge system with an example coupling device at the top of a tank having a nozzle for a process connection made by flange and nozzle including a feed-through, subwavelength CTL, MC with a plurality of metal fingers, and optional tapered dielectric coating, along with an impedance plot (on the right side of FIG. 1) along the length of the probe from the top of the nozzle that evidences a smooth improved impedance transition and matching from the feed-through to the free space impedance, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments provide coupling devices for coupling a coaxial cable/transmission line on PCBA to a GWR probe which eliminate or at least largely minimize the deleterious influence (e.g., echoes) from the top of the tank and ringing-like influences from nozzle geometry for tanks with nozzles on level measurements. For tanks with nozzles, disclosed designs of the probe impedance within the nozzle and at the input of the tank minimizes the ringing effects and correspondingly the so-called "dead-zone" at the top of the tank, where the GWR level transmitter cannot measure the level of a product in a tank, or interface between two products due to multiple reflections coming from the beginning and the end of the nozzle, and/or top of the tank, which can "flood" the reflection signal of interest. In addition, the maximum measurement range is increased due to decreased mode conversion losses, minimized ringing effects in tanks containing a nozzle, and improved impedance matching along entire propagation chain of the E-M wave (see impedance plots in FIG. 1 and FIG. 2 described below).

FIG. 1 depicts a radar level gauge system 100 including an example coupling device (3, 5, 6 and optionally 11) for a tank 40 with a nozzle 12, according to an example embodiment, where a 50Ω feed-through 3 and a coaxial cable or other transmission line connector 2 embodied as a 50Ω coaxial cable may be used in one particular embodiment. As described below, disclosed coupling devices having MCs with metal fingers and optionally also a tapered dielectric region allow GWR probes to reach maximum level measurement range and minimum upper dead-zone by improving the TEM-TM mode conversion and impedance matching along the wave guiding probe. The CTL 5, MC 6 and tapered dielectric coating 11 will "screen" the nozzle impact on E-M propagation along the single conductor probe 10, and thus will help minimize the effect of higher diameter nozzle to higher order mode formation, and therefore minimize the ringing effects specific to such nozzle geometry.

Figure 3:
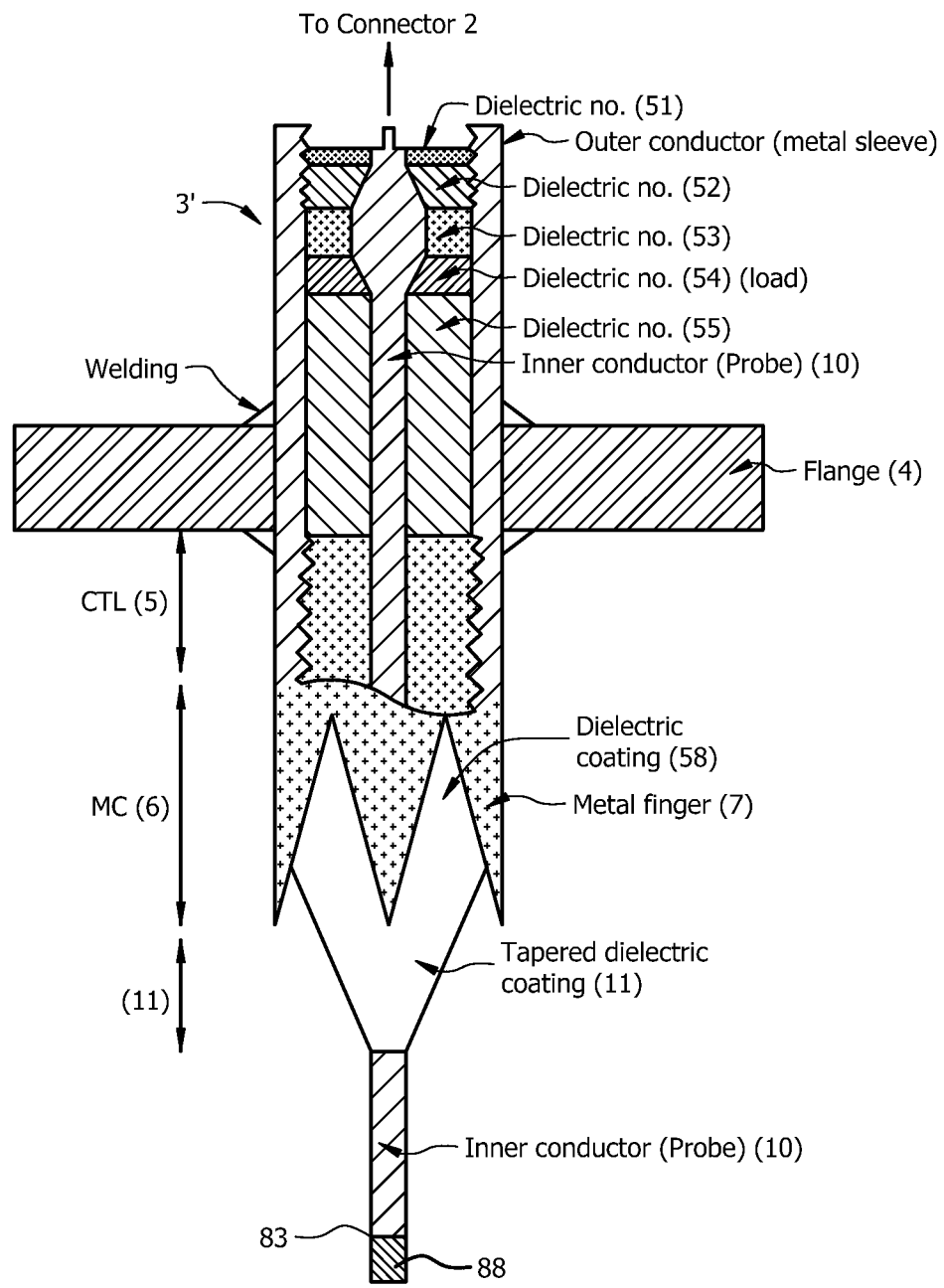
FIG. 3 is a hybrid view of an example coupling device having a monolithic feed-through having a stack of a plurality of different dielectrics designed to comply with a 50 to 100Ω impedance and to stack together terminating on the MC of the coupling device, suitable for nozzle or nozzle-less tanks, including a cross sectional depiction evidencing the monolithic feedthrough, according to an example embodiment.

The coupling device is for a process connection to a coaxial cable 2 or other connector such as a transmission line on PCBA connected to the transceiver 1, made by flange 4 and nozzle 12. As an example, the coupling device includes a feed-through 3 with an impedance of 50 ohm±5 ohms, a subwavelength CTL 5 having a length from $\lambda/5$ to $\lambda/2$ which can have an impedance of 35 to 48 ohms or 52 to 65 ohms (for fiducials), and a MC 6 having a plurality of metal fingers (7) of length $2\lambda \pm 20\%$ extending from the metal sleeve forming the outer conductor of a subwavelength CTL 5, and optional tapered dielectric coating 11. In one embodiment, the same dielectric material may be used for subwavelength CTL 5, MC 6 and the tapered region 11, made from a common (single, monolithic) dielectric piece, which is threaded to the common metal sleeve of the feed-through 3, subwavelength CTL 5 and MC 6 (as shown in FIG. 3 described below). Here, $\lambda$ is associated with the center frequency of the interrogation pulse bandwidth used in operation of system 100 and light velocity in the specific dielectric in which the E-M wave propagates.

In the case of a GWR system based on 50Ω transmission lines between the transceiver 1 and process connection, the subwavelength CTL 5 can have an impedance somewhat above or below 50 ohms so that the resulting reflection signal can be used as fiducial. The metal sleeve of subwavelength CTL 5 can be part of a monolithic metal sleeve of the coupling device including feed-through 3 and metal fingers 7 that no additional welding (or other attachment) is needed for assembly. The dielectric thickness of subwavelength CTL 5 and its dielectric constant can be selected so that the CTL 5 impedance is above or below 50Ω to provide a controlled and minimum reflection fiducial radar signal which is used as time reference for level measurement.

The MC 6 includes a dielectric coating 58. The MC 6 having a plurality of metal fingers 7 is quite distinct from a conventional classical flared horn MC. The length of the disclosed metal fingers 7 as noted above is $2\lambda \pm 20\%$. MC 6 includes an inner conductor (single probe), a dielectric of uniform thickness, where the plurality of metal fingers 7 of the MC 6 will form a horn-less mode converter, which can be used even for low diameter nozzles, due to absence of lateral expansion, as occurs for the case flared conical horns. The metal fingers 7 of the MC 6 are all generally monolithically connected to the outer conductor of the subwavelength CTL 5 and the feed-through 3. The MC 6 can be thus an integral part of a monolithic coupling device including the feed-through 3, the subwavelength CTL 5 and the MC 6, containing a common metal sleeve, made from a single piece of metal material.

MC 6 having the plurality of metal fingers 7 has been found to perform the conversion of Transverse Electric and Magnetic (TEM) mode specific to coaxial line to the Transverse Magnetic (TM) mode specific to surface waves propagating under the guidance of the probe. Although the metal fingers 7 of the MC 6 are shown as a plurality of triangular metal fingers (7), the metal fingers may take on other shapes including rectangular fingers, or corrugated triangular, or corrugated rectangular fingers.

The tapered dielectric coating 11 has a length of about $2\lambda$, such as $2\lambda \pm 20\%$. The tapered dielectric coating 11 improves measurement performance because it provides a significant MC function as it is recognized most of the electromagnetic energy is not confined to the center of the probe. An impedance plot is shown along the length of the probe on the right side of FIG. 1 from the top of the nozzle 12 that evidences smooth impedance transition and improved impedance matching as compared to the known art coupling arrangement where the single conductor probe has a tapered dielectric coating below the nozzle.

In operation, as shown in FIG. 1 along the MC 6, the surface wave is gradually increasing the impedance from its value given by the CTL 5 to higher values, without almost any influence from the nozzle geometry. To further improve the impedance adaptation towards to free space impedance of about 377Ω, and minimize the influence of the nozzle and upper metal parts of the tank, the dielectric used above for covering the inner conductor of subwavelength CTL 5 and MC 6 is shown as a gradually (monotonically) a tapered dielectric coating 11 having a length of about $2\lambda$. As noted above in one embodiment, the dielectric for subwavelength CTL 5, MC 6 and tapered dielectric coating 11 can all be made from the same dielectric material, and thus in the form of a single piece of dielectric material. Along this tapered dielectric coating 11, the product level can already be detected.

Therefore, the total length of the coupling device, under the feed-through 3, where the product level cannot be measured is equal to about $2.5\lambda$, which means about 26.5 cm (about 10") for a dielectric constant equal to 2, and about 11.8 cm (about 4.5") for a dielectric constant of the dielectric material in subwavelength CTL 5, MC 6 and tapered dielectric coating 11 equal to 10. In the last case, this means that in the case of a nozzle of about 4 inch to 6 inch in length, almost the whole tank is available for level measurement if one takes into account that the dead-zone for a disclosed probe connection design may be significantly decreased with respect to the known art.

In addition, for example, for the case of a GWR system based on 50Ω transmission lines between transceiver 1 and feed-through 3, GWR probes having a disclosed coupling device essentially eliminate the ringing effects due to higher diameter nozzles and reduce the mode conversion losses as well as impedance mismatch losses, by the presence of the subwavelength CTL 5 and MC 6, shown with the improvement in the gradual impedance transition from 50Ω feed-through to the 377Ω of the free space. This last result may further increase the maximum level measurement range for the GWR level transmitter. Similar advantages are obtained for the case of the coupling the electronic block of level transmitter to the probe located in a tank in the absence of the nozzle, as described below with a coaxial cable or other transmission line connector (2), 50-100Ω impedance threaded feed-through 3', subwavelength CTL 5, MC 6 and optional tapered dielectric 11.

Figure 2:
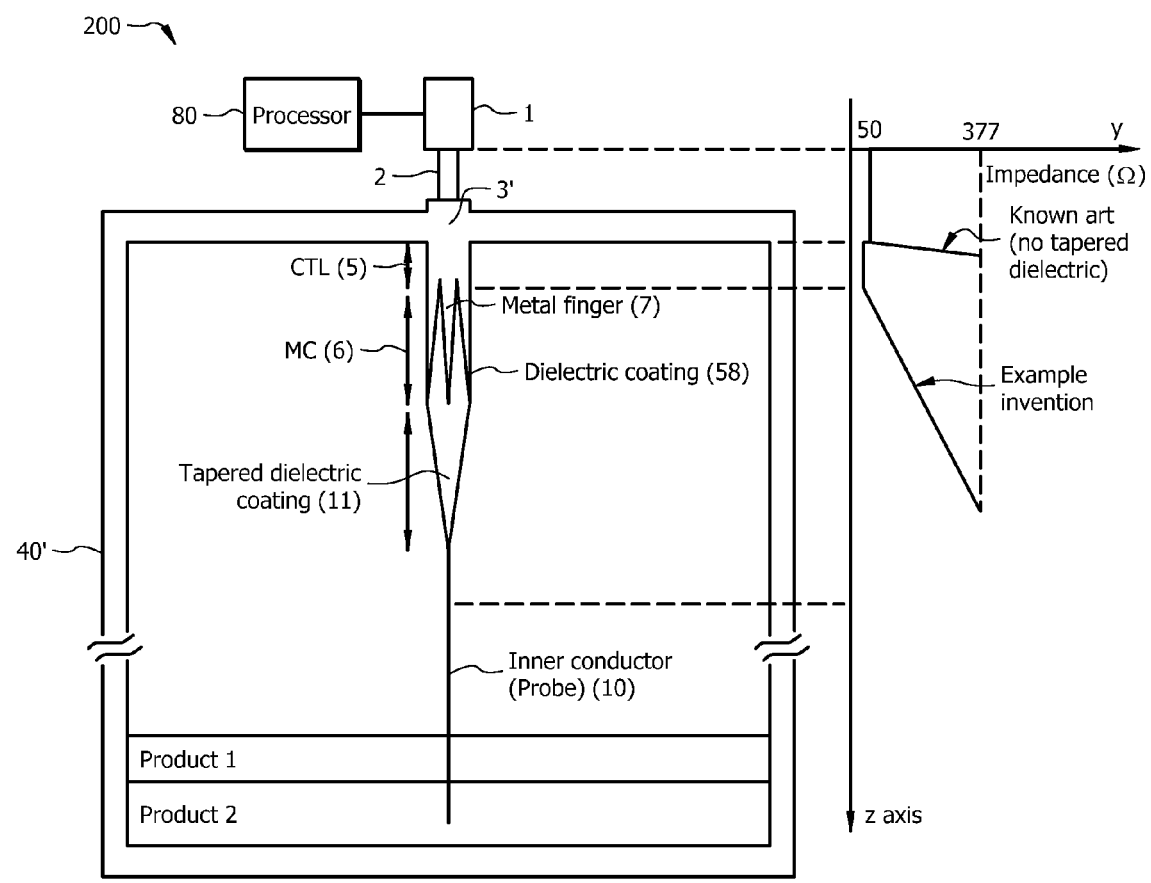
FIG. 2 depicts a radar level gauge system with an example coupling device at the top of a nozzle-less tank for a threaded process connection, including a feed-through, subwavelength CTL, mode converter and optional tapered dielectric coating, along with an impedance plot (on the right side of FIG. 2) along the length of the probe from the top of the nozzle that evidences improved impedance matching as compared to a known art coupling arrangement shown, according to an example embodiment.

FIG. 2 depicts a radar level gauge system 200 with an example coupling device at the top of a nozzle-less tank 40' for a threaded process connection, including a threaded feed-through 3', subwavelength CTL 5, MC 6 having a plurality of metal fingers 7 and optional tapered dielectric coating 11, along with an impedance plot (on the right side of FIG. 2) along the length of the probe from the top of the nozzle, The impedance plot shown evidences a smooth impedance transition and thus improved impedance matching for the "example invention" as compared to the abrupt impedance transition of known art coupling arrangement shown as known art (no tapered dielectric) for a 50Ω coaxial cable as the coaxial cable or other transmission line connector and a 50Ω impedance for feed-through 3. Another key effect of disclosed approaches may be the elimination (or at least substantial reduction) in the deleterious effect of the nozzle geometry and/or top of the tank on the mode conversion and wave impedance. At practical level, one may reach the case where the same type and size of coupling device may be used for all types and sizes of nozzle geometries or threaded process connections to a different tanks, and still avoiding the ringing effects and impedance mismatches coming from different nozzle geometries.

The improvement shown by the example invention in FIG. 2 is enabled by a smooth impedance variation from the impedance of the CTL 5 to the impedance of single conductor probe 10 in free space (377 ohm). On the other hand, in the known art, for the case threaded process connection, there is an abrupt impedance variation from the 50 ohm impedance of the feed-through to the impedance of the single conductor probe in free space, of about 377 ohm, with the highest impedance variation generally in the first 5 to 10 cm of the probe, or an essentially step-change in impedance, near the feed-through 3. Such a sharp impedance transition for prior art is generating a huge echo from the top of the tank, limiting thus the maximum measurement range and increasing the length of the dead-zone.

FIG. 3 is a hybrid (top cross section) view of an example coupling device 300 having a monolithic feed-through 3' terminating on other components of the coupling device including subwavelength CTL 5 and MC 6 having metal fingers 7, including a cross sectional depiction evidencing the upper portion of the monolithic feedthrough 3', according to an example embodiment. As an example, the coupling device 300 comprises a feed-through 3' nominally 50Ω having a stack of multiple dielectrics shown as five (5) dielectrics (dielectric no. 51 to no. 55), a subwavelength CTL 5 (e.g., impedance around 50Ω), a MC 6 having metal fingers 7 and a an impedance transition region having a tapered dielectric coating 11, all together making a smooth impedance transition from about 50Ω to the free space impedance of 377Ω, effectively without influence of nozzle or tank geometry. As noted above, the coupling device may be configured with a common (monolithic) outer metal sleeve, eliminating the need for welding between component pieces.

The feed-through 3' shown in FIG. 3, has its outer conductor obtained from the metal sleeve of the coupling device, and the inner conductor is the upper segment of the single conductor probe, while a sequence of dielectric elements (dielectric no. 51 to no. 55) are selected as materials and designed as geometry so that to preserve 50Ω impedance along entire feed-through 3'. The respective dielectrics are generally stacked together, and can be sealed, such as with a VITON (which is a fluoroelastomer) ring, for example. Some of the VITON rings can do the sealing on the inner conductor circumference, while other VITON rings can do the sealing on the inner part of the metal sleeve.

A similar design approach can be followed for 100Ω feed-through 3, or any other impedance feed-through 3. The subwavelength CTL 5 of length $\lambda/5$ to $\lambda/2$ is designed to obtain an impedance value slightly lower or higher than 50Ω by taking into account the conductor diameters and type of dielectric and its dielectric constant as described above.

In this example, the feed-through 3' is built to act as a CTL with a nominal 50Ω impedance. The design of the diameter of the inner conductor and outer conductor as well as the selection of the dielectric material located between the two conductors is made starting from the requirement of a substantial 50Ω impedance of the feed-through 3 in each section of it, according to the impedance formula for CTL noted above. The dielectrics no. 51-55 of the feed-through 3' are designed to comply with 50Ω impedance and to contribute to the sealing together such as with o-rings (not shown). The dielectrics no. 51 and 52 are mounted through the upper side of the coupling device 300, while the dielectrics no. 53-55 are mounted through the lower side of the coupling device 300. Regarding assembly, the assembly of the tandem made of feed-through and probe can be done as follows: the lower dielectrics 53-55 assembled first, then add the inner conductor (probe) 10, and finally insert the top dielectrics 51 and 52, which will be connected to the coaxial cable or other transmission line connector 2 going to the transceiver 1.

As described above, the subwavelength CTL 5 can be designed to have an impedance of a slightly higher or lower than 50Ω in the case of 50Ω feed-through. In FIG. 3, the diameter of the inner conductor and outer conductor are kept constant with respect to feed-through 3', while the dielectric 58 of the subwavelength CTL 5 is increased to a higher value of dielectric constant, so that a decrease of impedance of subwavelength CTL 5 is obtained. For example, if dielectric no. 55 of feed-through 3' is Teflon (dielectric constant=2.1), then dielectric no. 58 of subwavelength CTL 5 of could be PEEK™ with a dielectric constant=3.3. This will give subwavelength CTL 5 and impedance equal to about 40Ω. In other cases for subwavelength CTL 5, the diameters of the inner conductor may be slightly decreased, and diameter of outer conductor may be increased, while the dielectric constant of dielectric may be smaller than that of a common polytetrafluoroethylene (PTFE) known as TEFLON in order to obtain say a 70Ω subwavelength CTL 5.

The dielectric 58 of subwavelength CTL 5 can be a cylindrical tube in length from $\lambda/5$ up to $\lambda/2$, which as noted above can be continued with the dielectric of MC 6 of length about $2\lambda$ and terminated on a tapered (conical) region of tapered dielectric 11 about $2\lambda$ in length. The cylindrical region of dielectric 58 of subwavelength CTL 5 can be threaded to the metal sleeve of the feed-through 3' to get it held tight to the outer conductor (metal sleeve) of entire coupling device 300. At the output of the tapered dielectric 11, the upper segment of the probe 10 is shown connected at interface 83 to a long single conductor probe 88 (not shown long), such as by welding, screwing, etc. The coupling device 300 may be welded to the metal flange which is then connected and sealed to the tank flange (not shown). Besides a welded flange, it is also possible to have a pipe thread on a flange, or other joining arrangement.

One approach is to preserve the inner and outer diameters in the feed-through 3' is to select a dielectric with a higher dielectric constant, such as a thermoplastic in the polyaryletherketone (PAEK) family such as PEEK™ (dielectric constant at 1 MHz of about 3.3) which will provide the subwavelength CTL 5 with impedance of about 40 ohm, for the case of 50Ω feed-through 3, as well as the dielectric for MC 6 and the dielectric for the tapered region. As described above, the MC 6 having metal fingers 7 can be formed by removing a plurality of triangular elements from the outer conductor of the coupling device, while the remaining metal fingers of length equal to about 2λ are intimately in contact with the underlying tubular dielectric (uniform thickness). The final region of impedance adaption is made of a tapered dielectric 11 around the probe, having a length of about 2λ. As noted above, the cylindrical dielectric for subwavelength CTL 5, MC 6 and the tapered dielectric coating 11 for impedance adaptation can be made of the same (a single, monolithic) dielectric piece (for example PEEK™), and this dielectric portion can be tightly inserted in the coupling device by a threaded region around the cylindrical zone.

The coupling device 300 can be used for both tanks such as tank 40 having a nozzle (FIG. 1), and nozzle-less tanks such as tank 40' (FIG. 2) provided with a threaded processes connection. In the second case, the coupling device 3' is threaded on its outer side. An alternative, "non-monolithic" construction of the coupling device 3' is where the feed-through 3' is built separately, as one piece, while the subwavelength CTL 5, MC 6 having metal fingers 7, tapered dielectric 11 are built as a second separate piece, and these two pieces to be connected one to the other by different means (threading, welding) only for the case of applications where low-loss electromagnetic transmission is desired. Thus, the cost of the GWR level transmitter can be finely tuned to the level range measurement.

Regarding the frequency design of the disclosed coupling devices, the lengths of subwavelength CTL 5, MC 6 and impedance adapter 11 are all directly correlated with the central operation frequency associated to the bandwidth of the pulse signal used for level measurement. Thus, their design is scaled with the operational center frequency.

The wavelength (λ) is related to the operational center frequency of the interrogation pulse bandwidth by the well known formula: λ=v/f, where v is the light velocity in a medium with relative permittivity (dielectric constant), $\in_r$, and relative magnetic permittivity, $\mu_r$, and f is the frequency of electromagnetic signal.

$$v=v_o/((\in_r{}^*\mu_r))^{1/2},$$

where $v_o$ is the light velocity in vacuum and air (300,000 Km/s).

The length of the subwavelength CTL 5 can be chosen so that the width of the time reference signal (or fiducial pulse) reflected from the impedance mismatch between the coaxial cable or other transmission line connector 2 (e.g., 50Ω transmission line on a PCBA terminated on coaxial connector which is butt coupled to feed-through) and about 40Ω CTL 5 to be lower than the wave propagation time through the subwavelength CTL 5. Similar designing can be used for a 100Ω impedance for the feed-through 3. As noted above, a maximum length of the subwavelength CTL 5 is generally about λ/2.

The length of the MC 6 should generally be equal to a few wavelengths. A value of 2λ is a simple example. The exact value of the length of the MC 6 should be obtained after considering the relation between its length and MC efficiency, on one hand, and the number of metal fingers 7 on the other hand.

Similarly, the length of the tapered dielectric 11 should generally be equal to a few wavelengths. Along this distance, the TM mode ($H_z$=0, $E_z$≠0) transmission energy of the surface wave will be gradually expanded on the radial direction to the value specific to free-space propagation under guidance of the probe. At the end of the tapered dielectric coating 11, an impedance of 377Ω specific to free space is obtained. As described above, the length was disclosed to be =2λ, but the exact value can be obtained after maximization of the efficiency of the coupling device as a function of this value, too. For the calculation of length of the tapered dielectric coating 11 one can use the dielectric constant of 3.3 specific to PEEK™ polymer, as described above. For example, if the pulse width in the time domain has a duration of about 0.5 ns, then, one can consider that the central operation frequency is lower than 2 GHz.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A coupling device for impedance matching a guided wave radar (GWR) system, comprising:
    a feed-through to a tank having an outer metal sleeve on a dielectric on an inner conductor, said feed-through for connecting to a coaxial cable or other transmission line connector that includes an inner conductor that connects to an output of a transceiver and an outer conductor that connects to said outer metal sleeve;
    a subwavelength coaxial transmission line (CTL) coupled to said feed-through including an inner conductor connected to said inner conductor of said feed-through and an outer conductor connected to said outer metal sleeve, and includes a dielectric between its said inner and said outer conductor; and
    a mode converter (MC) having a plurality of metal fingers of length 2λ± twenty percent connected to said outer conductor of said subwavelength CTL, said MC including a dielectric coating on its inner conductor connected to said inner conductor of said subwavelength CTL.

2. The coupling device of claim 1, wherein said subwavelength CTL has an impedance that provides an impedance mismatch of 3% to 20% with respect to an impedance of said feed-through.

3. The coupling device of claim 1, wherein said outer metal sleeve, said outer conductor of said subwavelength CTL and said metal fingers of said MC are made from a common piece of material and are all electrically connected together.

4. The coupling device of claim 1, further comprising an impedance matching region comprising a tapered dielectric coating monotonically reducing in thickness along its length, having a length of at least 2λ surrounding an inner conductor connected to said inner conductor of said MC.

5. The coupling device of claim 1, wherein a top portion of said tank includes a nozzle, and wherein said feed-through is joined to a flange that is mechanically connected and sealed to said nozzle.

6. The coupling device of claim 1, wherein said tank is nozzle-less, and wherein said feed-through is a threaded feed-through.

7. The coupling device of claim 6, wherein said threaded feed-through includes a plurality of different dielectrics stacked together.

8. The coupling device of claim 4, where a dielectric material for said subwavelength CTL, said MC and said tapered dielectric coating are all part of a single common piece of said dielectric material.

9. A coupling device for impedance matching a guided wave radar (GWR) system, comprising:
   a feed-through having an outer metal sleeve on a dielectric on an inner conductor, said feed-through for connecting to a coaxial cable or other transmission line connector that includes an inner conductor that connects to an output of a transceiver and an outer conductor that connects to said outer metal sleeve;
   a subwavelength coaxial transmission line (CTL) having a length from λ/5 to λ/2 coupled to said feed-through including an inner conductor connected to said inner conductor of said feed-through and an outer conductor connected to said outer metal sleeve, and includes a dielectric between its said inner and said outer conductor;
   a mode converter (MC) having a plurality of metal fingers of length 2λ± twenty percent connected to said outer conductor of said subwavelength CTL, said MC including a dielectric coating on its inner conductor connected to said inner conductor of said subwavelength CTL, and
   an impedance matching region comprising a tapered dielectric coating monotonically reducing in thickness along its length, having a length of at least 2λ surrounding an inner conductor connected to said inner conductor of said MC.

10. A guided wave radar (GWR) system for determining a filling level of a product material in a tank, comprising:
    a transceiver outside said tank for generating, transmitting and receiving radar signals;
    a single conductor probe inside said tank electrically connected to said transceiver via a coaxial cable or other transmission line connector, and
    a coupling device extending along a portion of said single conductor probe for impedance matching said GWR system, comprising:

a feed-through having an outer metal sleeve on a dielectric on an inner conductor, said feed-through for connecting to said coaxial cable or other transmission line connector that includes an inner conductor that connects to an output of said transceiver and an outer conductor that connects to said outer metal sleeve;
   a subwavelength coaxial transmission line (CTL) inside said tank coupled to said feed-through including an inner conductor connected to said inner conductor of said feed-through and an outer conductor connected to said outer metal sleeve, and a dielectric between its said inner and said outer conductor; and
   a mode converter (MC) having a plurality of metal fingers of length 2λ±twenty percent connected to said outer conductor of said subwavelength CTL, said MC including a dielectric coating on its inner conductor connected to said inner conductor of said subwavelength CTL,
   said single conductor probe for guiding a transmitted signal from said transceiver towards a surface of said product material, and for returning a surface echo signal resulting from reflection of said transmitted signal at said surface back towards said transceiver, and
   a processor connected to said transceiver for determining said filling level based on said surface echo signal.

11. The system of claim 10, wherein said subwavelength CTL has an impedance that provides an impedance mismatch of 3% to 20% with respect to an impedance of said feed-through.

12. The system of claim 10, wherein said outer metal sleeve, said outer conductor of said subwavelength CTL and said metal fingers of said MC are made from a single common piece of metal material and are all electrically connected together.

13. The system of claim 10, further comprising an impedance matching region comprising a tapered dielectric coating monotonically reducing in thickness along its length, having a length of at least 2λ surrounding an inner conductor connected to said inner conductor of said MC.

14. The system of claim 10, wherein a top portion of said tank includes a nozzle, and wherein said feed-through is joined to a flange that is mechanically connected and sealed to said nozzle.

15. The system of claim 11, wherein said tank is nozzle-less, and wherein said feed-through is a threaded feed-through.

16. The system of claim 15, wherein said threaded feed-through includes a stack of a plurality of different dielectrics.

17. The system of claim 13, wherein a dielectric material for said subwavelength CTL, said MC and said tapered dielectric coating are all part of a single common piece of said dielectric material.

18. The coupling device of claim 1, wherein said subwavelength CTL has a length from λ/5 to λ/2.

19. The system of claim 10, wherein said subwavelength CTL has a length from λ/5 to λ/2.

* * * * *